March 14, 1967      L. F. HAMPTON      3,308,645
DIE FOR PRODUCING SELF-LOCKING THREADED FASTENER
Original Filed Aug. 12, 1960      3 Sheets-Sheet 1
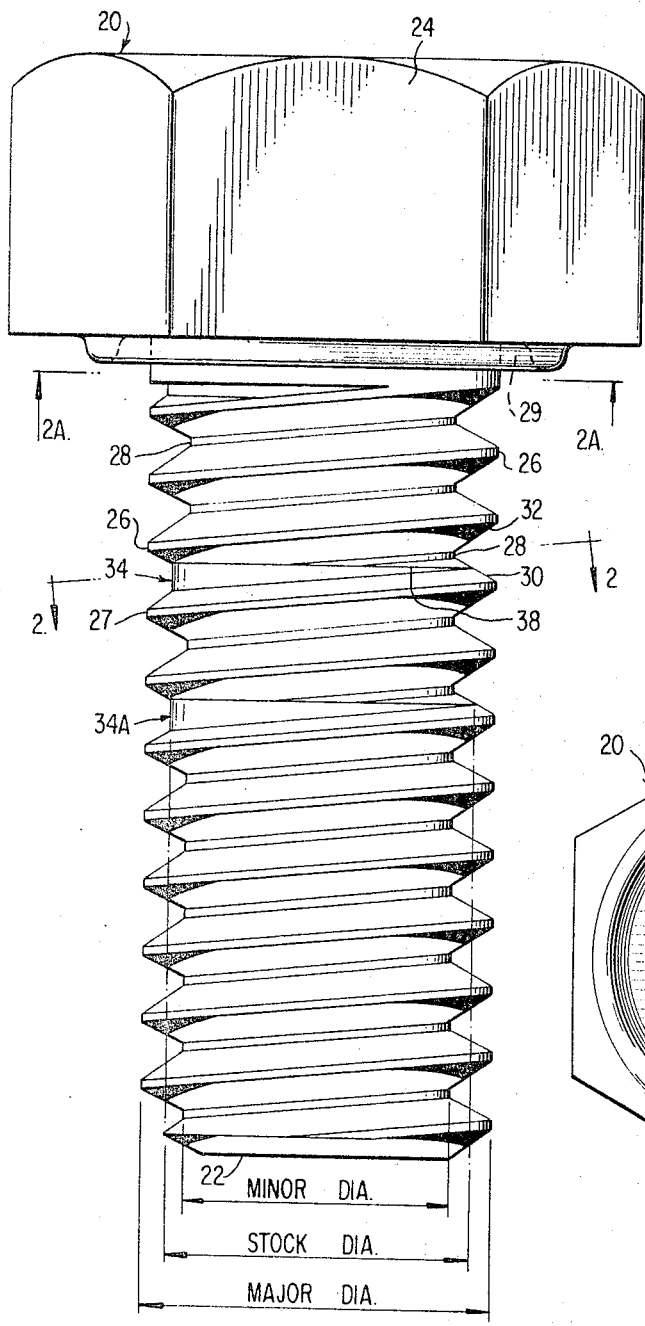
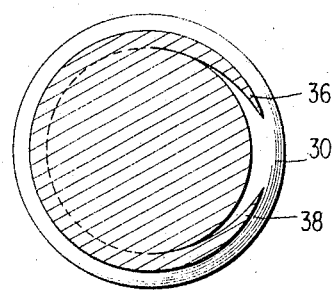
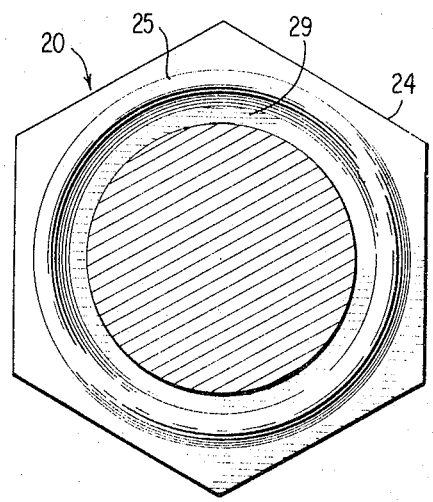
INVENTOR
LYNN F. HAMPTON
BY *LeBlanc & Shur*
ATTORNEYS

INVENTOR.
LYNN F. HAMPTON

March 14, 1967 L. F. HAMPTON 3,308,645
DIE FOR PRODUCING SELF-LOCKING THREADED FASTENER
Original Filed Aug. 12, 1960 3 Sheets-Sheet 3

INVENTOR.
LYNN F. HAMPTON
BY
ATTORNEYS

United States Patent Office 3,308,645
Patented Mar. 14, 1967

3,308,645
DIE FOR PRODUCING SELF-LOCKING THREADED FASTENER
Lynn F. Hampton, Columbus, Ohio, assignor to Columbus Bolt and Forging Co., Columbus, Ohio, a corporation of Ohio
Original application Aug. 12, 1960, Ser. No. 49,267. Divided and this application Nov. 19, 1963, Ser. No. 343,428
4 Claims. (Cl. 72—469)

This invention relates to self-locking threaded fasteners and die appartus for producing same.

This application is a division of my prior application Ser. No. 49,267 filed Aug. 12, 1960, now abandoned.

In general the threaded fastener of the present invention includes an elongated shank portion provided with a plurality of thread convolutions forming spaced root portions and crest portions. A protruding portion for engagement with the crests on the threads of a coacting threaded element is formed between two adjacent convolutions with said protrusion having a configuration such that its radially outward extension progressively increases along a root portion and then progressively decreases along said root portion.

In accordance with the present invention it has been found that a thread interference protrusion of this configuration progressively engages and smoothly deforms the crests on the thread convolutions of a coacting threaded element such that the convolutions are effectively deformed into resilient locking engagement with the threaded element of the present invention.

As another aspect of the present invention a novel thread rolling die means is provided that serves to form the above described thread interference protrusion on self-locking fastener constructed in accordance with the present invention.

It is therefore an object of the present invention to provide an improved self-locking threaded fastener that includes a thread interference protrusion of novel configuration and gradually and smoothly deforms and resiliently engages convolutions on a coacting threaded element.

It is another object of the present invention to provide a thread rolling die of novel construction for forming self-locking threaded fasteners in accordance with the present invention.

Further objects and advantages of the present invention will be apparent from the following description, reference being had to the accompanying drawings wherein a preferred form of embodiment of the invention is clearly shown.

In the drawings:

FIG. 1 is a side elevational view of a self-locking threaded fastener constructed in accordance with the present invention;

FIG. 2 is a sectional view of the shank of the fastener of FIG. 1, the section being taken along the line 2—2 of FIG. 1;

FIG. 2A is a cross-sectional view looking along line 2A—2A in FIG. 1;

Figure 3:
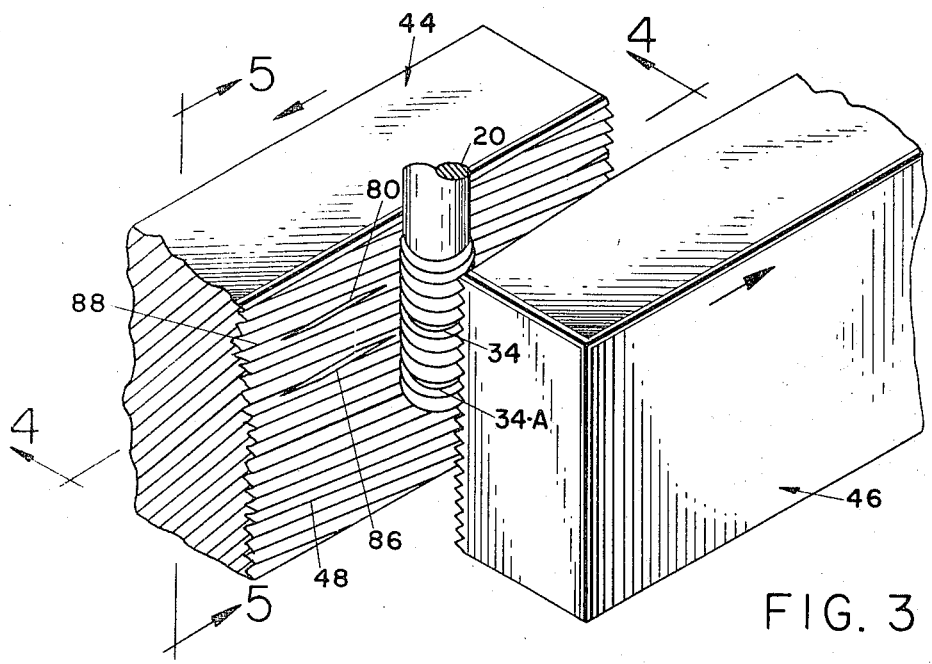
FIG. 3 is a partial perspective view of a thread rolling die constructed in accordance with the present invention.

Referring in detail to the drawings, a self-locking threaded fastener constructed in accordance with the present invention is indicated generally at 20 in FIGS. 1 and 2 and includes a shank portion 22 and a head portion 24.

Shank portion 22 includes a plurality of thread convolutions that form spaced crest portions, two of which are indicated at 26 and 27, located between spaced root portions 28. The root and crest portions are connected by flank portions, two of which are illustrated at 30 and 32.

With continued reference to FIGS. 1 and 2 a thread interference portion indicated generally at 34 is integrally formed between the two adjacent crest portions 26 and 27 and includes a leading end 36 and a trailing end 38.

As best seen in FIG. 2, the radial outward extension of protrusion 34 progressively increases as it extends circumferentially around the shank of the screw from leading end 36 to a location 40 at which the radially outward extension of protrusion 24 begins to decrease at a location indicated at 43 in FIG. 2 and continues to progressively decrease to the trailing end 38.

Fastener 20 can, if desired, be provided with additional thread interference protrusions of the configuration just described, one of said additional protrusions being indicated at 34-A.

Figure 5:
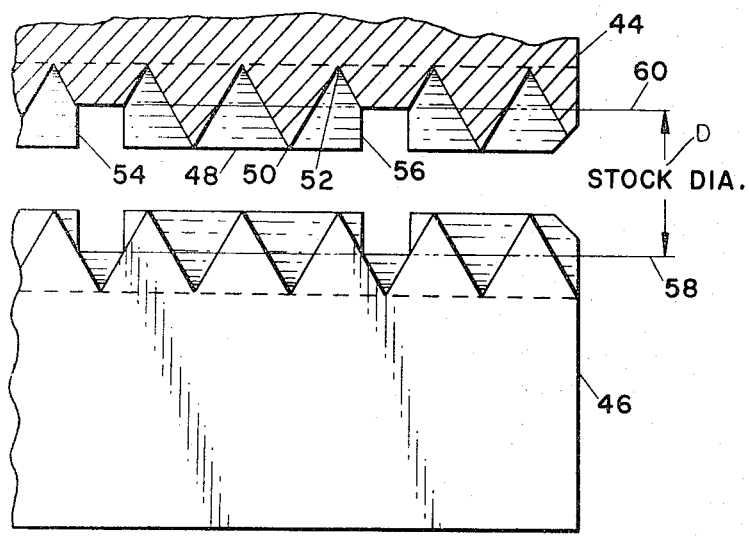
FIG. 5 is an end elevational view, partially in section of the die means of FIGS. 3 and 4, the section being taken along the line 5—5 of FIG. 3.
Figure 4:
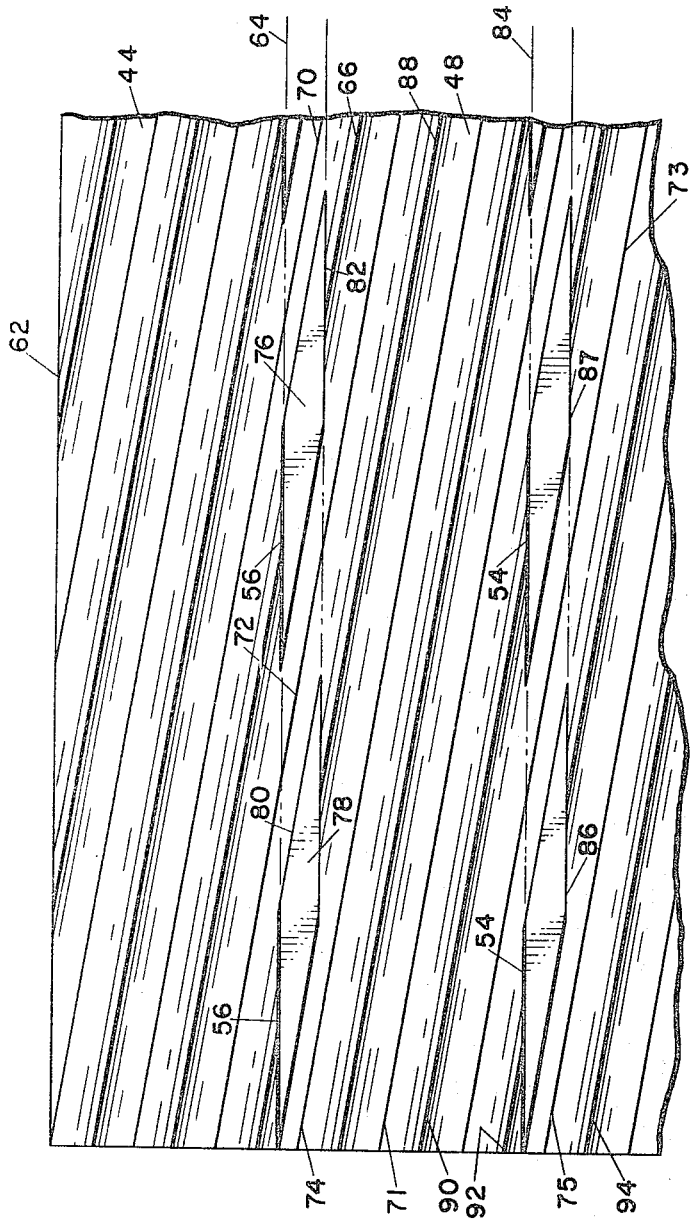
FIG. 4 is a partial plan view of a pressure applying surface of the die means of FIG. 3.

Reference is next made to FIGS. 3–5 which illustrate a novel thread rolling die construction for forming threaded fasteners of the type illustrated in FIGS. 1 and 2. The die includes relatively shiftable die members indicated generally at 44 and 46. Both of the die members include a face 48 provided with a plurality of crest portions 50 and root portions 52.

Longitudinally extending slots 54 and 56 are machined into the faces 48 of die members. The distance D between datum plane 58 and 60 lying along the bottom of the slots 54 and 56 is preferably established such that it is equal to the diameter of the bar stock from which the fasteners are formed. With this arrangement the slots 54 and 56 constitute longitudinally extending paths that extend across the die face 48 along which paths there is no rolling or deformation of the bar stock.

With reference to FIG. 5, longitudinally extending slots 54 and 56 actually appear as diamond shaped segments 80, 82, 86, and 88 since when a grinder is passed longitudinally along die face 48, in a direction parallel with upper edge 62, the path 64 of the grinding wheel will intersect, so far as the illustrated portion of the die face is concerned, only the crests 66 and 88 and the path 84 of the grinding wheel will intersect only the crests 90 and 92.

When the grinding wheel is moved along path 64 to form the depression 56 it will not engage the root portions 70, 72, and 74. Similarly, when the grinding wheel is moved along the path 84 to form the groove 54 it will not engage the root portions 71, 73, and 75. It will be understood that the maximum depth of grind will occur where the grinding wheel passes through the crests 66 and 68 and the crests 90 and 92. Where the grinding wheel passes through these crests the maximum depth of grind will occur at the central portions 76 and 78 of the diamond shaped segments 80 and 82.

In operation the bar stock is fed between the relatively shiftable thread rolling die members 44 and 46 whereby the bar stock is caused to roll along faces 48 of the die members. The crests on the die members, such as crests 66 and 88, which are intersected by the ground groove 56 form a root section 28 provided with a protrusion such as is seen at 34 in FIGS. 1 and 3. The crests that are intersected by the groove 54, which is intersected by the diamond shaped segments 86 and 88, form a root section and a corresponding protrusion such as is seen at 34-A in FIGS. 1 and 3. As the bar stock progresses along the die faces 48 of die sections 44 and 46 the protrusions 34 and 34-A will roll into the successive ground diamond shaped sections lying along the paths 64 and 84 of the grinding wheel.

In fabricating bolts in accordance with the present invention it has been found that efficient thread interference is obtained when the stock diameter is equal to the pitch diameter of the thread such that the unrolled portions forming the thread interference protrusions 34 and 34–A protrude outwardly from the minor or root diameter for a distance equal to approximately one-half of the distance between the root portions and the crest portions of the thread. This is achieved by establishing the depth of grooves 54 and 56, FIG. 5, so as to equal one-half the depth of the root portion 52 relative to the die face 48, seen in FIG. 5, and by establishing the distance between the confronting die faces 48 so that the distance between the datum planes 58 and 60 lying along the bottoms of the groove 54 and 56 is equal to the diameter of the bar stock. This is best illustrated in FIG. 5.

While the form of embodiment of the present invention as herein disclosed constitutes a preferred form, it is to be understood that other forms might be adopted, all coming within the scope of the claims which follows.

I claim:

1. An improved thread rolling die means comprising, in combination, first and second relatively movable die portions; a plurality of longitudinally extending crests on the face of one of said die portions, the longitudinal axes of said crests being inclined relative to the longitudinal axis of one of said die portions, said face of said die portion including a groove intersecting said crests, the horizontal sides of said groove being substantially parallel with the longitudinal axis of said die portion.

2. An improved thread rolling die means comprising, in combination, first and second relatively movable die portions; a plurality of longitudinally extending crests and root sections on the face of one of said die portions, the longitudinal axes of said crests being inclined relative to the longitudinal axis of one of said die portions, said face of said die portion including a groove intersecting said crests, the depth of said groove being substantially equal to one-half the distance between said crests and root sections.

3. An improved thread rolling die means comprising, in combination, first and second relatively movable die portions; a plurality of longitudinally extending crests and root sections on the face of one of said die portions, the longitudinal axes of said crests being inclined relative to the longitudinal axis of one of said die portions, said face of said die portion including a groove intersecting said crests, the longitudinal axis of said groove being substantially parallel with the longitudinal axis of said die portion, the depth of said groove being substantially equal to one-half the distance between said crests and root sections.

4. An improved thread rolling die as defined in claim 1, the depth of said grooving intersecting said crests being substantially equal to one-half the distance between said crests and root sections.

References Cited by the Examiner

UNITED STATES PATENTS 1,973,201   9/1934   Fassinger _____ 72—88

CHARLES W. LANHAM, Primary Examiner.

H. D. HOINKES, Assistant Examiner.